United States Patent [19]

Welsh

[11] Patent Number: 4,856,742

[45] Date of Patent: Aug. 15, 1989

[54] CONVERSION BRACKET FOR PORTABLE MICROSCOPES

[76] Inventor: Robert C. Welsh, 1600 Onaway Dr., Miami, Fla. 33133

[21] Appl. No.: 195,157

[22] Filed: May 18, 1988

[51] Int. Cl.⁴ .............................................. G02B 21/00
[52] U.S. Cl. .................................. 248/124; 248/316.1; 350/522
[58] Field of Search ................ 248/669, 74, 676, 511, 248/519, 523, 524, 539, 540, 541, 103, 105, 106, 121, 122, 176, 309.1, 312, 313, 316.1, 124; 350/522

[56] References Cited

U.S. PATENT DOCUMENTS

| 74,604 | 2/1868 | Sarony | 248/53 G |
|---|---|---|---|
| 1,319,774 | 10/1919 | Kallajian | 248/122 |
| 2,015,280 | 9/1935 | Morishita | 248/103 |
| 2,681,782 | 6/1954 | Morishita | 248/122 |
| 2,711,872 | 6/1955 | Lampke | 248/103 |
| 3,612,468 | 10/1971 | Hoppl et al. | |
| 3,809,454 | 5/1974 | Brambring | |
| 4,063,704 | 12/1977 | Rother | 248/176 |
| 4,339,100 | 7/1982 | Heller et al. | |
| 4,531,816 | 7/1985 | Baumgartel | |
| 4,668,057 | 5/1987 | Kleinberg | |

FOREIGN PATENT DOCUMENTS

| 247363 | 2/1947 | Switzerland | 248/106 |
|---|---|---|---|
| 10152 | of 1905 | United Kingdom | 248/511 |

Primary Examiner—Ramon O. Ramirez
Assistant Examiner—Robert A. Olson
Attorney, Agent, or Firm—Arnold, White & Durkee

[57] ABSTRACT

The invention relates to a portable bracket for holding a microscope, especially a heavy surgical eye-operating microscope. The bracket has an inverted L-shape with an upright column or stand and a horizontal arm member. A hollow tube is located at the outer end of the horizontal arm to receive a vertical support tube or neck of a microscope. The hollow tube is adaptable to receive various sizes of microscopes and render any heavy microscope more portable by eliminating the normally cumbersome attachment mechanisms. The neck of the miroscope is secured in the tube by a side lock knob which clamps the neck within the tube and/or a top lock knob which is attached to the neck of the microscope and abuts against a top face of the tube.

5 Claims, 3 Drawing Sheets

CONVERSION BRACKET FOR PORTABLE MICROSCOPES

BACKGROUND AND SUMMARY OF THE INVENTION

The present invention relates to a novel and improved bracket for holding a microscope. More particularly, the present invention relates to a bracket for supporting a portable, surgical microscope, especially an expensive, heavy eye-operating microscope, the bracket rendering the microscope more portable and adapting to various sizes of microscopes.

While performing missionary eye surgery in third world countries, severe difficulties have been experienced using conventional microscopes due to their weight and size, and the lack of modern laboratory and surgical facilities. In particular, while performing eye surgery, it is often necessary to use a microscope, preferably a high quality one. However, when surgery is not performed in a hospital or an equipped operating room, for example when it is performed in the field in third world countries under missionary conditions, it is almost impossible to use conventional, heavy and expensive surgical microscopes since they are not readily portable and cannot be adequately supported on light-weight table clamp stands or light-weight floor stands.

Further, one major disadvantage of using present day microscopes outside of hospital facilities is that there is no lightweight, portable bracket which is capable of supporting heavy surgical microscopes without the need for a support mounted on a ceiling, a wall or a heavy table or floor stand. Another disadvantage of present day microscopes is that there is no lightweight portable microscope holder which is capable of easily adapting to support various sizes of surgical microscopes.

Thus, there is a need for a bracket which converts any size of the heavy, expensive eye-operating microscopes to a more portable microscope, so they can be used in less conventional operating facilities.

It is an object of the present invention to provide a portable, lightweight, and relatively inexpensive bracket for converting heavy surgical microscopes to light-weight portable microscopes.

Another object of the present invention is to provide a novel and nonobvious microscope bracket which is easy to manufacture and easy to assemble.

A further object of the present invention is to provide a mircroscope bracket which is easily adaptable to many sizes of microscopes.

Still another object of this invention is to provide a bracket for a surgical microscope which does not require attachment to a ceiling, wall or heavy floor stand.

Yet another object of this invention is to provide a bracket for supporting expensive, heavy surgical microscopes so that they are usable outside of standard hospital or operating room facilities.

To achieve these and other objects, the present invention relates to a bracket for holding a microscope having a vertical neck support tube. The bracket includes an inverted L-shaped support member having a vertical arm and a horizontal arm, one end of said vertical arm having means for securing the support member to a foundation such as a light-weight boom arm or stand. A vertical support cylinder is attached to the horizontal arm, said support cylinder having a minimum diameter sufficient to receive the vertical support tube of a microscope. Fastening means are provided for securing the vertical support tube of the microscope in the support cylinder, the fastening means selectively adjustably changing the diameter of said support cylinder to fix said support tube in said support cylinder.

DESCRIPTION OF THE DRAWINGS

These and other objects of the present invention will become more apparent upon a full and complete reading of the following detailed description and accompanying drawings wherein like elements bear like reference numerals, and wherein.

DETAILED DESCRIPTION

Figure 1:
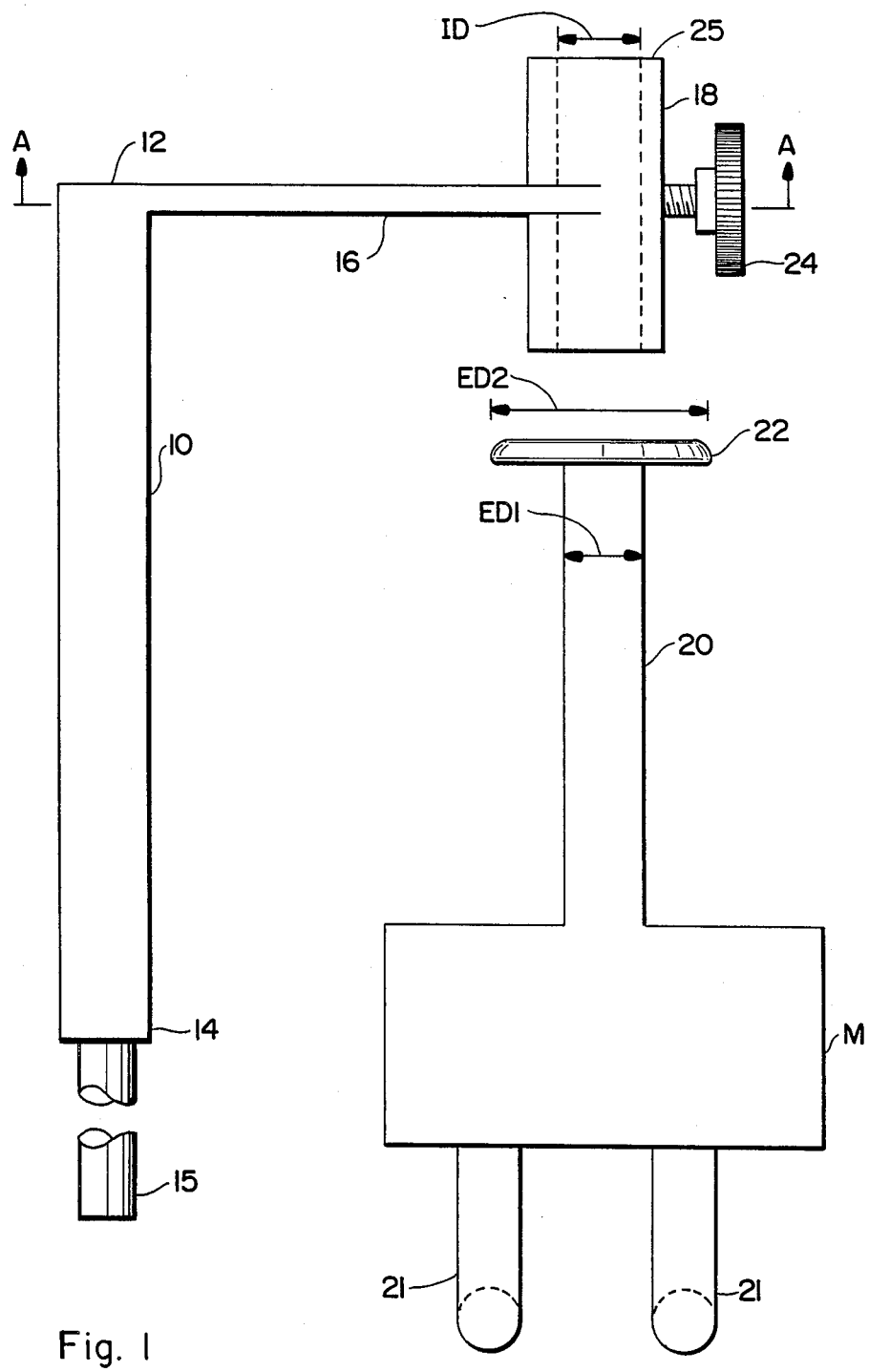
FIG. 1 illustrates a side view of the bracket.

Referring to the drawings, and specifically to Figure 1, there is illustrated a surgical microscope bracket generally referred to by reference numeral 10. The surgical bracket includes, generally, an L-shaped support member 12. The L-shaped support member has a vertical support member 14 and horizontal arm member 16. The vertical support member 14 is preferably a hollow, cylindrical tube. The lower end of the vertical support member 14 is an extension portion 15 which is used to mount the bracket on a foundation, such as a table or floor stand or the like. In a preferred embodiment, the extension portion 15 is received in a clamp or vice attached to a table or floor stand such that the vertical support member is securely held in an upright position.

Figure 2:
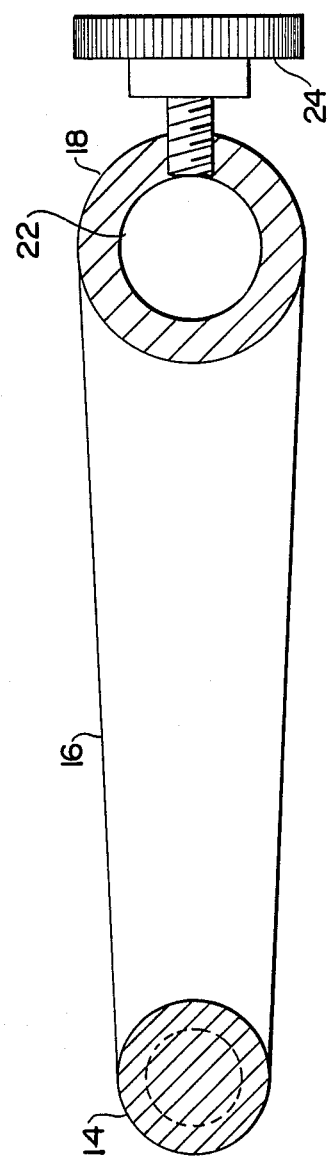
FIG. 2 illustrates a top view of the bracket.
Figure 3:
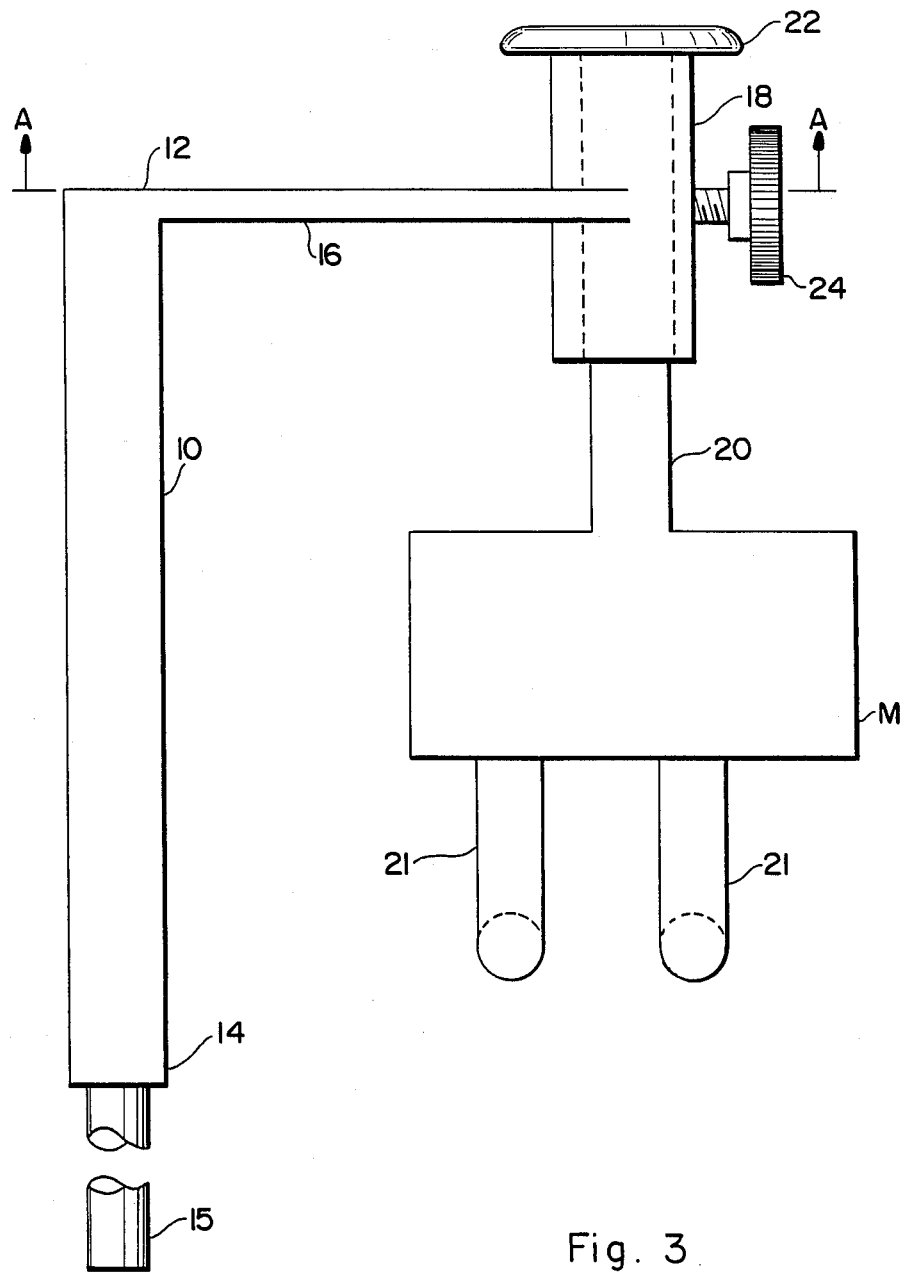
FIG. 3 illustrates a side view of the bracket in operation.

The upper end of the vertical support arm 14 is secured to one end of the horizontal arm member 16 while an opposite end of the horizontal arm member 16 supports a tube member 18. The horizontal arm member 16 (FIG. 2) may be a plate or cylindrical member, as long as it is able to withstand the load created by a microscope M inserted in the tube member 18, as discussed below. The microscope M is illustrated schematically in FIGS. 1 and 3 as a block with a vertical support neck 20 and two lenses 21.

The tube member 18 is a hollow cylinder oriented generally parallel to the vertical support member 14. The tube 18 has an internal diameter ID greater than the external diameter ED1 of a top suspending support neck 20 of several microscopes, for example, the Zeiss Omni One microscope or other similar microscopes. In addition, the tube 18 has a length equal to or less than the length of the supporting neck 20 for the microscopes.

The supporting neck 20 of the microscope usually includes a lock member 22 threadably engaging the neck 20 of the microscope. In most instances, the internal diameter ID of the support tube 18 is smaller than the external diameter ED2 of the lock member 22. In the event that the internal diameter ID of the support tube 18 is larger than the external diameter ED2 of the lock member 22, the lock member should be replaced with a larger diameter lock member 22 such that its external diameter ED2 is larger than the internal diameter ID of the tube 18.

In addition, a side screw lock member 24 is located on the side of the support tube 18 opposite to the side connecting the tube 18 to the horizontal am member 16. The side screw-lock member 24 is a threaded bolt which passes through the side of the tube 18 and into the internal cylinder defined within the tube 18. Rotation of the side screw lock member 24 adjusts the internal diameter of the tube 18. In addition, rotation of the side screw-lock member 24 when the microscope neck 20 is inserted therein moves the threaded bolt into the tube 18 to contact the neck 20 or to become inserted within a recess in the neck 20 to hold the neck 20 within the tube 18. The side screw lock member 24 also stabilizes the microscope within the tube by preventing rotation of the microscope. If the recess in the neck 20 surrounds the periphery of the neck 20, and the member 24 contacts the recess without pressing against the base of the recess, then the microscope is supported in the tube, but can rotate without falling from the tube.

The operation of the bracket is as follows. The bracket 10 is mounted in a support such as a boom arm of a table or floor stand by insertion of extension portion 15 into the support mechanism such as the clamp or vice. The bracket is secured in the upright position with the horizontal arm 16 over the operating area. The vertical support neck 20 of the microscope is then inserted into the support tube 18 by removing the lock member 22 from the neck 20 and inserting the neck 20 upwardly through the support tube 18. Once the vertical support neck 20 has been inserted into tube 18, the lock knob member 22 is threaded back onto the support neck 20 of the microscope so that the lock member 22 rests against a top face 25 of the tube 18. Since the internal diameter ID of the tube 18 is less than the external diameter ED2 of the support tube 18, the neck 20 of the microscope M cannot fall through the tube 18. The side screw lock knob member 24 is then rotated to insert the bolt into the tube 18 such that the end of the bolt abuts against the neck 20. In this manner, the heavy, surgical microscope is supported without the need for the heavy supports used in hospital or operating room facilities.

Different size microscopes can be supported by the present invention since the diameter of the tube 18 accepts microscopes having different sized necks. For a larger microscope, knob member 24 would not be screwed as tightly to secure the microscope as they would be for a smaller microscope.

In addition, the microscope bracket of the present invention converts many sizes of heavy microscopes into a portable microscope. That is, the heavy microscope can be transported with and supported by the lightweight bracket of the invention, thereby eliminating the normally cumbersome attachment mechanisms used to support the microscope on a heavy floor stand or a wall or ceiling in conventional medical facilitates.

Although the microscope bracket of the present invention has been described in connection with the preferred embodiment thereof, it will be appreciated by those skilled in the art that additions, modifications, substitutions and deletions not specifically described may be made without departing from the spirit and scope of the invention defined in the appended claims. For example, the microscope need not have a top lock member 22 because the side lock member 24 can be used by itself to secure the microscope in the tube. Similarly, the side lock member 24 could be eliminated if the top lock member 22 is utilized.

What is claimed is:

1. A microscope supporting device, comprising:
   a microscope having a vertical neck support which defines a first external diameter, and a lock member selectively engaging a portion of the vertical neck support, the lock member having a second external diameter greater than the first external diameter;
   a bracket for supporting the microscope by the neck support, the bracket comprising
   an inverted L-shaped support member having a vertical arm and a horizontal arm, one end of said vertical arm having means for securing the support member to a foundation;
   a vertical support cylinder attached to an end of said horizontal arm for receiving the neck support of the microscope, said support cylinder having an internal diameter greater than the first external diameter of said neck support and less than the second external diameter of the lock member so that the lock member abuts against a top surface of the support cylinder; and
   fastening means for securing the vertical neck support of the microscope in said support cylinder, said fastening means selectively decreasing the internal diameter of said support cylinder relative to the external diameter of said vertical neck support to fix said neck support in said support cylinder.

2. The microscope supporting device according to claim 1 wherein the means for securing the support member to a foundation comprise a cylindrical extension member adapted for reception within a clamping mechanism in the foundation.

3. The bracket according to claim 1 wherein the lock member threadably engages a top portion of said vertical neck support and abuts against a top face of said vertical support cylinder.

4. The microscope supporting device according to claim 1 wherein said fastening means for decreasing the external diameter of said support cylinder includes a lock knob extending through a side of said support cylinder to selectively abut against said vertical neck support of the microscope to clamp the neck support within the support cylinder.

5. The microscope supporting device according to claim 4 wherein said lock knob includes a threaded member which selectively projects into the vertical support cylinder to contact the vertical neck support of the microscope.

* * * * *